United States Patent Office.

VALENTINE BELIKAN, OF CINCINNATI, OHIO, ASSIGNOR OF ONE-HALF TO WILLIS S. BARROWS, OF SAME PLACE.

COMPOUND FOR AND PROCESS OF RENDERING FABRICS WATER-PROOF.

SPECIFICATION forming part of Letters Patent No. 250,874, dated December 13, 1881.

Application filed September 17, 1881. (No specimens.)

*To all whom it may concern:*

Be it known that I, VALENTINE BELIKAN, of Cincinnati, in the county of Hamilton and State of Ohio, have invented a new and useful Compound for and Process of Rendering Fabrics Water-Proof, of which the following is a specification.

My invention relates to a compound for and process of rendering textile fabrics impervious to water without impairing their capacity for permitting the passage of air and vapor.

I prepare three distinct mixtures, which being subsequently blended, the goods to be rendered weather and water proof are dipped or immersed therein, and afterward suffered to dry. The first mixture is prepared by dissolving fifty parts of alum and thirty-five parts of sugar of lead, separately, in as much distilled water as will respectively form solutions of the same, and then mixing the two solutions together. For the second mixture, I combine seventeen parts of paraffine with thirty-five parts of benzine or other light hydrocarbon, and having cut into small pieces seventeen parts of caoutchouc I drop the same therein, and stir until complete solution of the caoutchouc is effected. Mixtures 1 and 2 having been permitted to stand, a third vessel is provided, and the clear supernatant liquor of each mixture is decanted into said vessel. I then (for mixture 3) add to eight parts of commercial alcohol four parts of eau-de-cologne or oil of lemon, or other deodorant, and stir the same into the aforesaid liquor. The thus completed compound is then ready for use, which is done by immersing the goods therein, and closing the receptacle up for twelve hours, occasionally agitating the contents. When sufficiently saturated the goods are withdrawn from the liquor, and are dried by any suitable means, such as passing between hot calenders or through rubber or other wringers, or by being subjected to the action of a centrifugal evaporator. After drying, the goods may be subjected to similar operations for restoring the gloss and nap to those now employed after the process of shrinking—such as the action of rapidly-revolving slickers or brushes.

One marked advantage of my process is that without seriously shrinking the goods they are protected from liability to subsequent injury or alteration from the weather, and require no special shrinking treatment.

Without restricting myself to any one description or kind of fabrics, my invention is more particularly designed for the waterproofing of goods composed of animal fiber, such as those consisting in whole or principally of wool or silk.

I am experimenting with the object of similar applications to other fabrics—such as leather, paper, straw goods, &c.—and reserve the right to make one or more of these applications the subject of separate patents.

Having thus described my invention, what I claim as new, and desire to secure by Letters Patent, is—

1. The compound for rendering fabrics water-proof, consisting of an aqueous solution of alum and sugar of lead, mingled with caoutchouc dissolved in paraffine and benzine, to which is added alcohol of commerce and eau-de-cologne, or other equivalent deodorant, in the manner and proportions substantially as set forth.

2. The process of waterproofing fabrics, consisting in immersing the same for about twelve hours in a solution of alum and sugar of lead with distilled water, and of caoutchouc with paraffine, benzine, alcohol, and eau-de-cologne, or like deodorant, then withdrawing the goods and passing the same through heated rollers or other suitable drying device, substantially as set forth.

In testimony of which invention I hereunto set my hand.

VALENTINE BELIKAN.

Attest:
GEO. H. KNIGHT,
SAML. S. CARPENTER.